(12) United States Patent
Kawai (10) Patent No.: US 7,408,697 B2
(45) Date of Patent: Aug. 5, 2008

(54) DISPLAY DEVICE AND METHOD FOR MANUFACTURING THE SAME, AND ELECTRONIC APPARATUS

(75) Inventor: Hideyuki Kawai, Fujimi-cho (JP)

(73) Assignee: Seiko Epson Corporation (JP)

( * ) Notice: Subject to any disclaimer, the term of this patent is extended or adjusted under 35 U.S.C. 154(b) by 283 days.

(21) Appl. No.: 11/268,632

(22) Filed: Nov. 8, 2005

(65) Prior Publication Data

US 2006/0103915 A1   May 18, 2006

(30) Foreign Application Priority Data

Nov. 18, 2004   (JP)   ............... 2004-334612
Jul. 28, 2005    (JP)   ............... 2005-219020

(51) Int. Cl.
   *G02B 26/00*   (2006.01)
   *B01J 13/02*   (2006.01)
(52) U.S. Cl. ............... 359/296; 430/32; 264/4; 427/213.31; 427/213.32
(58) Field of Classification Search ............... 359/296; 430/32; 264/4–4.7; 427/213.31, 213.32
   See application file for complete search history.

(56) References Cited

U.S. PATENT DOCUMENTS 6,440,877 B1   8/2002   Yamazaki et al.
6,872,672 B2   3/2005   Yamazaki et al.
2003/0231162 A1*  12/2003  Kishi ............... 345/107

FOREIGN PATENT DOCUMENTS

| JP | 64-86116 | 3/1989 |
|---|---|---|
| JP | 2000-035769 | 2/2000 |
| JP | 2001-76872 A | 3/2001 |
| JP | 2001-272702 | 10/2001 |
| JP | 2002-318396 | 10/2002 |
| JP | 2002-532756 | 10/2002 |
| JP | 2003-140124 | 5/2003 |
| WO | WO 00/36465 | 6/2000 |

OTHER PUBLICATIONS

Eiji Nakamura, et al., "Development of Electrophoretic Display Using Microcapsulated Suspension", Engineer of Development Dept., NOK Corp., 1988 SID,.

* cited by examiner

*Primary Examiner*—Evelyn A. Lester
(74) *Attorney, Agent, or Firm*—Harness, Dickey & Pierce, P.L.C.

(57) ABSTRACT

A display device including: a first substrate having a pixel electrode; a second substrate having a common electrode; a microcapsule sandwiched between the first substrate and the second substrate; and a display material changing its optical characteristic in response to an electrical stimulation, the display material being encapsulated in the microcapsule, the microcapsule being selectively disposed on a display area formed by the pixel electrode in between the first substrate and the second substrate, and a background area of one of the first substrate and the second substrate being colored with a background color, the background area serving as a background with respect to the display area.

18 Claims, 8 Drawing Sheets

DISPLAY DEVICE AND METHOD FOR MANUFACTURING THE SAME, AND ELECTRONIC APPARATUS

RELATED APPLICATION INFORMATION

This application claims priority to Japanese Application Nos. 2004-334612, filed Nov. 18, 2004, and 2005-219020, filed Jul. 28, 2005, each of whose contents are expressly incorporated by reference.

BACKGROUND OF THE INVENTION

1. Technical Field

The present invention relates to a display device including a microcapsule and a method for manufacturing the same, and an electronic apparatus equipped with the display device.

2. Related Art

In the related art, an electrophoretic display device which has an electrophoretic dispersion liquid including a liquid dispersion medium and electrophoretic particles is known. When an electric field is applied to the electrophoretic dispersion liquid, a distribution of the electrophoretic particles is changed and an optical characteristic of the electrophoretic dispersion liquid changes. The electrophoretic display device utilizes this optical characteristic change to display. Since such electrophoretic display device does not require a backlight, it can contribute to reducing the cost and making the display device thinner. Further, because the electrophoretic display device has a memory effect of the display in addition to a wide viewing angle and a high contrast, it attracts a lot of attention as a next-generation display device.

An electrophoretic display device in which the electrophoretic dispersion liquid is encapsulated in a microcapsule is also proposed as described in a first example of related art, for example. Encapsulating the electrophoretic dispersion liquid into the microcapsule has an advantage in that the spill of the dispersion liquid during the manufacturing process of the display device can be prevented and precipitation and aggregation of the electrophoretic particles can be reduced.

In a case where an electrophoretic display device equipped with such microcapsule is manufactured, generally, the microcapsule is coated on a whole surface of a substrate on which a common electrode is formed. Then, a substrate on which a pixel electrode is formed is bonded on the coated surface of the microcapsule so as to be laminated (e.g. refer to a second, third, and fourth examples of related art).

A method is also known in which the microcapsule is discharged from the inkjet nozzle on the pixel electrode one by one using the inkjet method (e.g. refer to a fifth example of related art).

The examples of related art are as follows: Japanese Unexamined Patent No. 1-86116 is the first example; Japanese Unexamined Patent No. 2002-318396 is the second example, particularly paragraph [0004]; Japanese Unexamined Patent No. 2002-532756 is the third example, particularly FIG. 7B; SID 98 DIGEST pp. 1014-1017 is the fourth example; and Japanese Unexamined Patent No. 2000-35769 is the fifth example.

However, the method in which the microcapsule is coated on the whole surface of the substrate on which the common electrode is formed has the following disadvantages.

(1) A material is partially wasted. Because, the microcapsule is coated on the whole surface of the substrate, so that the microcapsule is also coated on an area other than a display area forming an actual display and a background area forming the background of the display area.

(2) The background is simply purposed to allow the display of the display area to be clearly observed, and originally, not required to change its display. Therefore, driving the background so as to be a background color results in waste in a circuit configuration. Additionally, coating the microcapsule on the background causes waste of the material.

(3) In a case where the display device is made by bonding each substrate, typically, a conductive part is formed on one substrate. The conductive part applies a voltage to the other substrate. Then, the substrates are bonded so that the conductive part is electrically conducted to the electrode of the other substrate. That is, in the aforementioned examples, typically, the conductive part is formed in advance on the substrate on which the pixel electrode is formed. The substrate on which the pixel electrode is formed and the substrate on which the common electrode is formed are bonded so that the conductive part is electrically conducted to the common electrode. However, the microcapsule is coated on the whole surface of the substrate on which the common electrode is formed. Thus, the microcapsule should be removed from a part that is electrically conducted to the conductive part before bonding. In order to remove the microcapsule, for example, a method that stripes it mechanically or chemically using solvents, etc., is employed. However, either method gives damages to the common electrode serving as a lower layer. As a result, display characteristics of the resulting display device are lowered. In addition, the removal of the microcapsule that has been coated results in the waste of the material.

(4) Typically, after bonding the substrates, the space between the peripheral parts of the substrates is sealed to protect the electrode and microcapsule from moisture, etc. If the microcapsule is coated to the sealed part, lowering sealing ability between the substrates. Accordingly, the microcapsule disposed at the peripheral part of the substrate is required to be removed before bonding them. However, the removal of the microcapsule causes the same disadvantage as that is described in (3).

The method in which the microcapsule is discharged from the inkjet nozzle on the pixel electrode one by one has a disadvantage in that it requires discharging a number of microcapsules for coating, lowering productivity due to the longer coating time.

SUMMARY

An advantage of the invention is to provide a display device, a method for manufacturing the same that can eliminate the waste of the material of microcapsule, simplify the circuit construction, and prevent the lowering of display characteristics caused by stripping the microcapsule and productivity, and an electronic apparatus equipped with the display device.

According to a first aspect of the invention, a display device includes a first substrate having a pixel electrode, a second substrate having a common electrode, and a microcapsule sandwiched between the first and second substrates. In the capsule, a display material that changes its optical characteristic in response to an electrical stimulation is encapsulated. In the display device, the microcapsule is selectively disposed on a display area formed by the pixel electrode in between the first and second substrates, and a background area of the first or second substrate is colored with a background color. The background area serves as a background with respect to the display area.

According to the display device, the microcapsule is selectively disposed on the display area. This selective disposing to a necessary place eliminates the waste of the material. In addition, the background area serving as the background with respect to the display area is colored with the background color. Thus, the microcapsule located in the background is not required to drive its display material as the conventional way. As a result, the circuit is simply constructed. Further, the waste of the material caused by coating the microcapsule on the background is eliminated.

In the display device, the display material may be an electrophoretic dispersion liquid including a liquid dispersion medium and an electrophoretic particle. As a result, the display device performs the electrophoretic display. The device has advantages in that it needs no backlight, and has a wide viewing angle, a high contrast, and a memory effect of the display, etc.

In the display device, the substrate serving as the background area preferably has a base member colored with the same color as that of the background color. Accordingly, the coloring process is not required that colors particularly the background area with the background color by printing or the like. As a result, manufacturing processes are simplified.

In the display device, the background area is preferably formed by a partition that surrounds the display area. As a result, the microcapsule material can be more selectively disposed by disposing the microcapsule material to the area surrounded by the partition when the microcapsule material is disposed on the display area in the manufacturing.

In the display device, it is preferable that the first and second substrates are a flexible substrate. As a result, the application of the display device is expanded such as electronic paper.

According to a second aspect of the invention, a display device includes a first substrate having a pixel electrode, a second substrate having a common electrode, and a microcapsule sandwiched between the first and second substrates. In the capsule, a display material that changes its optical characteristic in response to an electrical stimulation is encapsulated. A method for manufacturing the display device includes a step for selectively disposing a microcapsule material including the microcapsule on a first area composed of a display area formed by the pixel electrode on the first substrate or an second area on the second substrate, the second area corresponding to the display area, a step for coloring one of a third area composed of a background area serving as a background with respect to the display area on the first substrate and a fourth area on the second substrate, the fourth area corresponding to the background area, with a background color, a step for drying the microcapsule material, and a step for bonding the first and second substrates after the drying step.

The method for manufacturing the display device has the following advantages. The microcapsule material including the microcapsule is selectively disposed on the display area or the area corresponding to the display area. This selective disposing only on a necessary place results in no waste of the material. In addition, a process is not required in which the coated microcapsule is stripped off. Thus, the lowering of the display characteristics caused by the process can be prevented. Also, the waste of the material caused by the stripping can be eliminated.

In addition, in the first substrate or the second substrate, the background area serving as the background with respect to the display area is colored with the background color. Thus, the microcapsule located in the background is not required to drive its display material as the conventional way. As a result, the circuit is simply constructed. Further, the waste of the material caused by coating the microcapsule on the background is eliminated.

In the method for manufacturing the display device, the display material may be an electrophoretic dispersion liquid including a liquid dispersion medium and an electrophoretic particle. As a result the display device performs the electrophoretic display. The device has advantages in that it needs no backlight, and has a wide viewing angle, a high contrast, and a memory effect of the display, etc.

In the method for manufacturing the display device, it is preferable that the microcapsule material is selectively disposed on the first area composed of the display area formed by the pixel electrode. As a result, the direct disposing of the microcapsule material to the display area allows an alignment or the like in the coating of the microcapsule to easily be conducted. Its coating accuracy also becomes better.

In the method for manufacturing the display device, it is preferable that the microcapsule material is selectively disposed using a dispenser when the microcapsule material is disposed. As a result, the use of the dispenser eases the selective disposing of the microcapsule material. Also, the material can be easily discharged with few influences of the viscosity of the microcapsule material or the diameter of the microcapsule.

In the method for manufacturing the display device, in a case where the pixel electrode is disposed in multiple numbers, all of these pixel electrodes are preferably formed so as to have the same area. Accordingly, the film thickness of the microcapsule material finally formed on the display area can be formed in nearly equal thickness by setting the amount of the microcapsule material supplied to the dispenser to be equal for every all display areas formed by each pixel electrode, or every area corresponding to it. As a result, the display performance of each pixel electrode can be uniformed.

In the method for manufacturing the display device, it is preferable that a lyophilic process is performed on the first area and a lyophobic process is performed on the third area when the microcapsule material is disposed on the first area, while the lyophilic process is performed on the second area and the lyophobic process is performed on the fourth area when the microcapsule material is disposed on the second area. Accordingly, the microcapsule material can be selectively disposed with higher accuracy.

In the method for manufacturing the display device, it is preferable that a partition is formed on the third area when the microcapsule material is disposed on the first substrate or on the fourth area when the microcapsule material is disposed on the second substrate, prior to the process in which the microcapsule material is selectively disposed. As a result, the microcapsule material can be more selectively disposed by disposing the microcapsule material to the area surrounded by the partition when the microcapsule material is disposed on the display area.

In the method for manufacturing the display device, it is preferable that the lyophilic process is performed on the first area when the microcapsule material is disposed on the first substrate or the second area when the microcapsule material is disposed on the second substrate, while the partition material having lyophobicity is used, prior to the process in which the microcapsule material is selectively disposed. Accordingly, the microcapsule material can be selectively disposed with higher accuracy.

In the method for manufacturing the display device, it is preferable that the first and second substrates are a flexible substrate. As a result, the application of the resulting display device is expanded such as electronic paper, etc.

An electronic apparatus according to a third aspect of the invention is equipped with the display device or the display device manufactured by the method. According to the electronic apparatus, no waste of the material is achieved as described above, and further, the circuit is easily constructed.

BRIEF DESCRIPTION OF THE DRAWINGS

The invention will be described with reference to the accompanying drawings, wherein like numbers refer to like elements, and wherein.

DESCRIPTION OF THE EMBODIMENTS

Below, the present embodiment will now be described in detail.

First Embodiment

First, a first embodiment of a display device according to the invention will be described.

Figure 1:
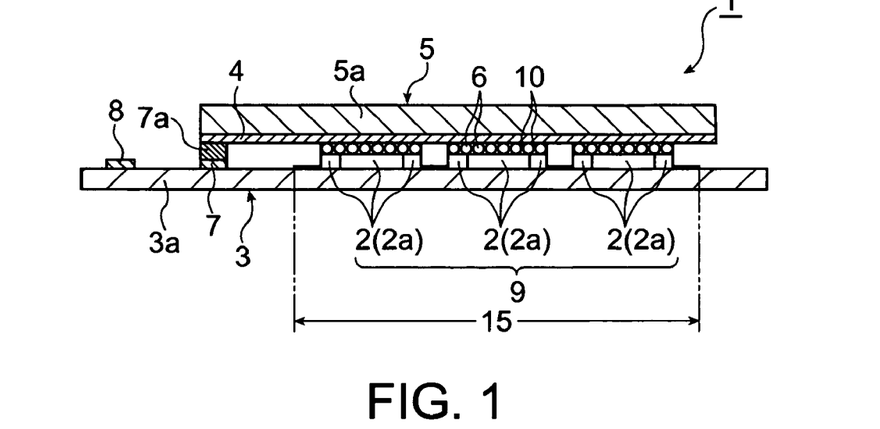
FIG. 1 is a sectional side view illustrating a schematic construction of a first embodiment of a display device according to the invention.

FIG. 1 is a diagram showing the first embodiment of the display device of the invention, and a display device 1 is shown in FIG. 1. The display device 1 includes a first substrate 3 having a plurality of pixel electrodes 2, a second substrate 5 having a common electrode (counter electrode) 4, and a microcapsule material having a microcapsule 6 into which a display material is encapsulated and a binder 10, is sandwiched between the substrates 3 and 5. In the display device 1, either one of the substrates can be employed as the display surface (observed surface). In this case, the substrate and electrode that serve as the display surface are required to have high light transparency. Particularly, transparent one is preferred.

The first substrate 3 has a rectangular shape. On a substrate 3a, formed are the plurality of pixel electrodes 2, a wiring (not shown) connected to the pixel electrodes 2, a conductive part 7 electrically conducted to the common electrode 4 of the second substrate 5, which will be described later, via a conductive material 7a, a wiring (not shown) connected to the conductive part 7, a terminal part 8 connected to each of the wirings, and the like. The second substrate 5 has a rectangular shape. On a substrate 5a, the common electrode 4 is formed. If necessary, a color filter is formed on one surface of the common electrode 4.

For the substrate 3a of the first substrate 3 and the substrate 5a of the second substrate 5, a resin substrate of film or a sheet having a rectangular shape is used, particularly, in a case where the display device 1 is an IC card or electronic paper, etc. that needs flexibility. In a case where each substrate serves as the display surface (observed surface) as described above, transparent one (having high light transparency) is used as also described above. For the material of the resin substrate, for example, polyethylene terephthalate (PET), polyethersulphone (PES), polyimide (PI), and polyethylene (PE) are preferably used. In a case where each substrate does not serve as the display surface, transparent one (having high light transparency) is not required. Thus, in addition to the above-described materials, polyesters such as polyethylene naphthalate (PEN), polystyrene (PS), polypropylene (PP), polycarbonate (PC), polyether ketone (PEEK), and acrylic resin or polyacrylates can be used.

In contrast, in a case where flexibility is not required for the display device such as a typical panel, glasses or hard resins can be used. Further, semiconductor substrates such as silicon, etc., also can be used.

In the other substrate facing the substrate that serves as the display surface (observed surface), at least the background area that serves as a background is formed with a background color.

As for the pixel electrode 2 and the common electrode 4, in a case where the substrate on which they are formed serves as the display surface (observed surface) as described above, transparent one (having high light transparency) is used. Specifically, conductive oxides such as indium tin oxide (ITO), etc., electron conductive polymers such as polyaniline, etc., and ion conductive polymers in which an ionic material such as NaCl, LiClO4, KCl, etc., is dispersed in a matrix resin such as polyvinyl alcohol resins, polycarbonate resins, etc., are exemplified. One or more than one type among these are chosen and used. In contrast, in a case where the substrate on which they are formed does not serve as the display surface, transparent one (having high light transparency) is not required. Thus, typical conductive materials such as aluminum (Al), or the like can be used.

In particular, the pixel electrode 2 forms a main part of the display area of the invention. That is, the display area of the invention includes the pixel electrode 2 as the main part. If necessary, it is constructed by including an area between the pixel elements 2 or a peripheral part of the pixel electrodes. Here, in a case where the area between the pixel electrodes 2 is served as the display area, even though the width between the pixel electrodes 2 is narrow, a little positioning shift can be tolerated even if it occurs when a microcapsule material is selectively coated on the pixel electrodes 2 or a position (an area) corresponding to them as described later. Particularly, taking productivity into consideration, the microcapsule material is sometimes continuously coated on the plurality of pixel electrodes 2 or the position corresponding to them by coating the microcapsule material on the area between the pixel electrodes 2 or the position corresponding to them. Alternatively, in a case where the peripheral part of the pixel electrodes 2 is served as the display part, since the peripheral part is secured as a margin, a little positioning shift can be tolerated even if it occurs when the microcapsule material is coated on the peripheral part as described later.

In the embodiment, particularly, the pixel electrode 2 is composed of a plurality of segment electrodes. On the pixel electrode 2 (segment electrodes), a display area 9 is defined.

Figure 2:
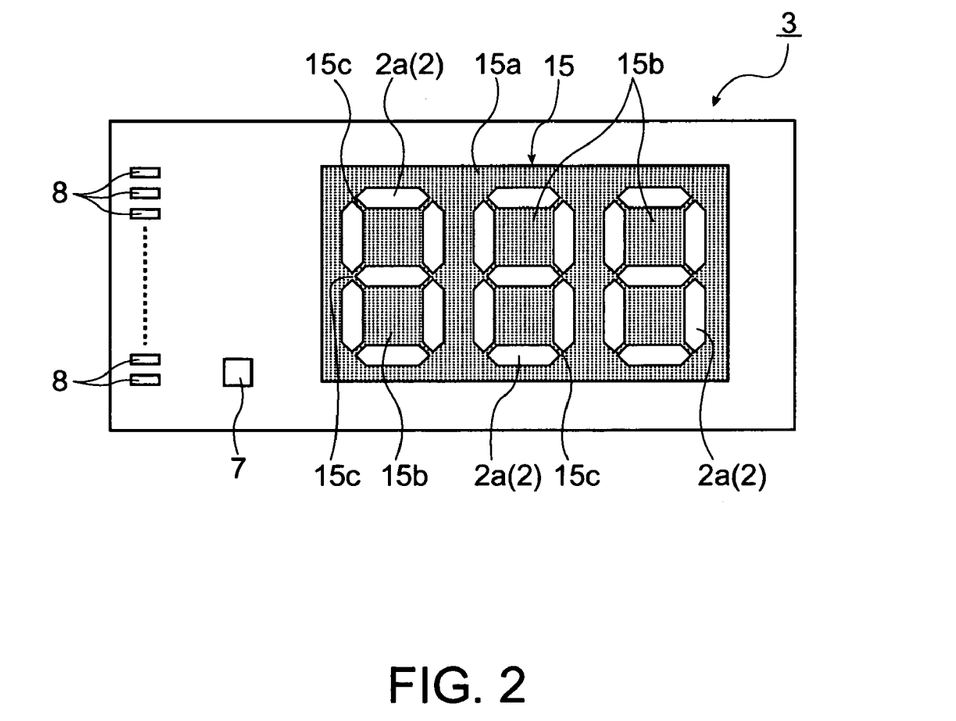
FIG. 2 is a plan view illustrating an inside surface of a first substrate.

FIG. 2 is a plan view showing an inside surface of the first substrate 3. In the first substrate 3, as described above, the pixel electrode 2 is composed of 7 segment electrodes 2a, each having the same shape and size, which are called a seven-segment The segment electrodes 2a are arranged in a figure of eight configuration so as to be able to display the figures from zero to nine. In the embodiment, three sets of the segment electrodes 2a are formed so as to be able to display three figures. With respect to the segment electrodes 2a formed and arranged as described above, its background is formed on the other substrate facing one substrate that serves as the display surface (observed surface). In the embodiment, the second substrate 5 on which the common electrode 4 is formed serves as the display surface. The background is formed on the first substrate 3 on which the pixel electrodes 2 are formed.

That is, as shown in FIG. 2, a background area 15 serving as the background is composed of an outer background area 15a located outside the segment electrodes 2a, an inner background area 15b located by surrounding with 4 segment electrodes 2a, and a gap background area 15c located between the segment electrodes 2a.

The background area 15 is the area serving as the background when the display material encapsulated in the microcapsule 6 performs an actual display. That is, the display material is made of an electrophoretic particle as described later. For example, in a case where the electrophoretic particle being composed of particles having two colors that are one for forming the display and the other for forming the background, the background area 15 is formed as the same color (background color) as that of particle for forming the background. Here, in the first substrate 3 forming the background area 15, the background color is not required only for the background area 15. For example, the whole of the substrate 3a included in the first substrate 3 may be colored with the background color as long as the background area 15 is included.

In the display device 1 of the invention, the microcapsule 6 into which the display material is encapsulated is selectively disposed only on the display area 9 by fixing with a binder 10 in between the first substrate 3 and the second substrate 5 as shown in FIG. 1.

The display material encapsulated in the microcapsule 6 changes its optical characteristics in response to an electrical stimulation. Specifically, one that mainly includes the electrophoretic particle or a liquid crystal is exemplified.

For the material that mainly includes the electrophoretic particle, an electrophoretic dispersion liquid is used that is composed of the electrophoretic particles and a liquid dispersion medium to disperse them.

As the liquid dispersion medium, a single or a mixture of the following materials to which a surfactant is added can be used: water, alcohol solvents such as methanol, ethanol, isopropanol, butanol, octanol or methyl cellosolve; esters such as ethyl acetate or butyl acetate; ketones such as acetone, methyl ethyl ketone or methyl isobutyl ketone; aliphatic hydrocarbons such as pentane, hexane or octane; an alicyclic hydrocarbon such as cyclohexane or methylcyclohexane; aromatic hydrocarbons having long-chain alkyl groups such as benzene, toluene, xylene, hexylbenzene, butylbenzene, octylbenzene, nonylbenzene, decylbenzene, undecylbenzene, dodecylbenzene, tridecylbenzene or tetradecylbenzen; halogenated hydrocarbons such as methylene chloride, chloroform, carbon tetrachloride or 1,2-dichloroethane; carboxylates; or other various oils.

The electrophoretic particles are organic or inorganic particles (high molecules or colloids) having the characteristic of moving based on electrophoretsis due to a potential difference in the liquid dispersion medium.

As for the electrophoretic particles, for example, one or more than one of the following pigments can be used: black pigments such as aniline black, carbon black, titanium black, etc.; white pigments such as titanium dioxide, zinc oxide, antimony trioxide, etc; yellow pigments such as monoazo, dis-azo, polyazo, and other azo-based pigments, isoindolenone, yellow lead oxide, yellow iron oxide, cadmium yellow, titanium yellow, antimony, etc.; red pigments such as monoazo, dis-azo, polyazo, and other azo-based pigments, quinacrilidone red, chrome vermillion, etc.; blue pigments such as phthalocyanine blue, indanthrene blue, anthraquinone-based dyes, prussian blue, ultramarine blue, cobalt blue, etc.; and green pigments such as phthalocyanine green, etc.

In addition, if necessary, the following agents can be added to these pigments: charge controlling agents formed of particles of electrolytes, surfactants, metal soaps, resins, rubbers, oils, varnishes, compounds or the like; dispersion agents such as titanium coupling agents, aluminum coupling agents or silane coupling agents; lubricating agents; and stabilizing agents.

As for the material forming a wall-film of the microcapsule 6, composite films of gum Arabic and gelatin, and compounds of urethane resins, urea resins, melamine resins, etc., can be used.

For the binder 10 to fix the microcapsule 6, one can be used that has a good affinity for the wall-film of the microcapsule 6, an excellent adhesiveness to the base member, and electrical insulation ability. For example, polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, polyvinyl alcohol polyvinyl formal, cellulose-based resin, or other thermoplastic resin, can be used. Also, polyamide-based resin, polyacetal, polycarbonate, polyethylene terephthalate, polybutylene terephthalate, polyphenylene oxide, polysulfone, polyamide imide, polyamino bismaleimide, polyether sulfone, polyphenylene sulfone, polyarylate, grafted polyphenylene ether, polyether ether ketone, polyether imide, and other heat resistant, mechanically strong polymers, polyethylene tetrafluoride, polyethylene propylene fluoride, ethylene tetrafluoride-perfluoroalkoxyethylene copolymer, ethylene-ethylene tetrafluoride copolymer, polyvinylidene fluoride, polyethylene trifluorochloride, fluororubber, or other fluororesins, silicone resins, silicone rubber, and other silicone resins, can be used as the binder material. As other binder material, methacrylic acid-styrene copolymer, polybutylene, methyl methacrylate-butadiene-styrene copolymer, etc. may be used.

Here, in the display device 1 of the embodiment, two types of electrophoretic particles are encapsulated in the microcapsule 6. One is charged with negative electricity, and the other is charged with positive electricity. As for the two types of the electrophoretic particles, for example, titanium dioxide is used for the white pigment, while carbon black is used for the black pigment. Using the two types: black and white of the electrophoretic particles, for example, in a case where figures or the like are displayed, the figures or the like are displayed by electrophoresing the black electrophoretic particles to the display surface side. In contrast, the segment electrode 2a except the electrode 2a performing an actual display with the black electrophoretic particles, forms the background with respect to the display formed with the black electrophoretic particles by electrophoresing the white electrophoretic particles to the display surface side.

Here, the background area 15 is formed as the same color (background color) as those of the particles forming the background as described above. Therefore, when the white electrophoretric particles are electrophoresed to the display surface side to form the background with respect to the display, the background formed by the white electrophoretic particles and the background of the background area 15 virtually cannot be differentiated the two because of the same color. As a result, the display with the black electrophoretic particles can be clearly viewed without any discrepancies in the background.

Next, a manufacturing method of the invention will be described based on the method for manufacturing the display device 1 constructed as described above. In the embodiment, the first substrate 3 having the pixel electrodes 2 is a glass substrate, while the second substrate 5 having the common electrode 4 is a flexible substrate of film or a sheet.

Figure 3A:
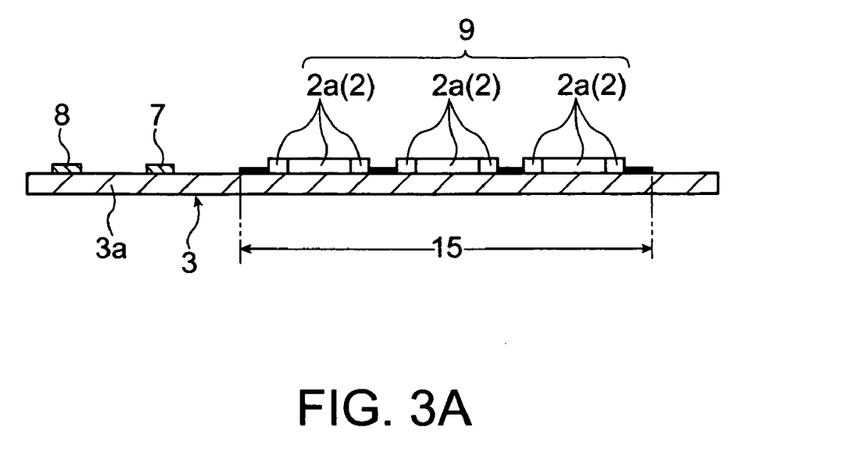
FIGS. 3A through 3C are diagrams to explain a manufacturing method of the first embodiment.

First, as shown in FIG. 3A, the inside surface side of the substrate 3a made of glass serving as the base member of the first substrate 3, at least the background area 15 is colored with the background color, i.e. white as the background color. The coloring method can include various printing methods such as screen printings, inkjet methods, etc. As for the area to be colored, while only the background area 15 may selectively be colored, the whole surface of the inside surface of the first substrate 3 may be colored unless it particularly causes disadvantages. Then, on the glass substrate 3a in which at least the background area 15 is colored with the background color, the pixel electrodes 2 are formed. Further, the conductive part 7 and the terminal part 8 are formed. Here, the pixel electrode 2 is composed of the plurality of segment electrodes 2a as shown in FIG. 2. Accordingly, in the first substrate 3, on each segment element 2a is defined as the display area 9.

Figure 3B:
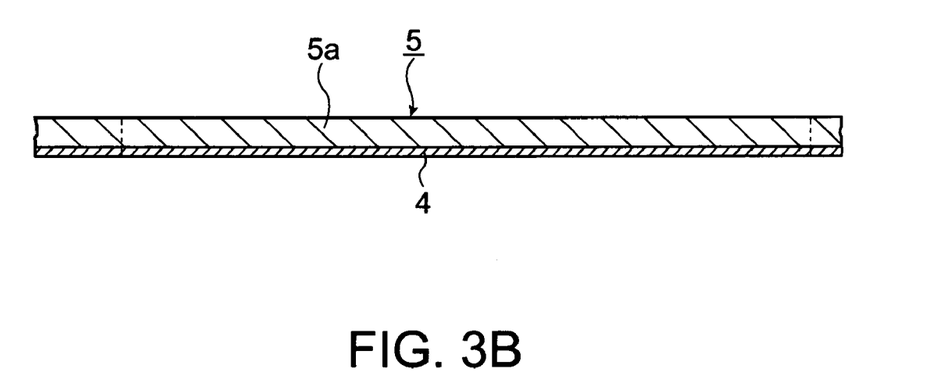

In addition to the substrate 3, the second substrate 5 is prepared as shown in FIG. 3B. The second substrate 5 is film or a sheet, which is supplied to the manufacturing with a condition of tape or the like before cutting it to a single plate. That is, the second substrate 5 is prepared so that the common electrode 4 made of a transparent conductive material has been formed on the whole surface of the inside surface of the substrate 5a having flexibility serving as the substrate material.

Figure 3C:
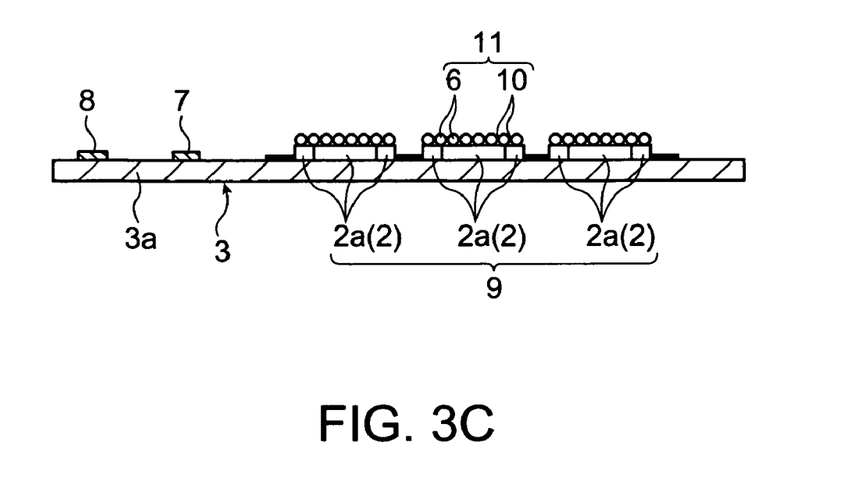

Particularly, in the first embodiment, to the first substrate 3, a microcapsule material 11 including the microcapsule 6 is selectively disposed as shown in FIG. 3C. Here, the microcapsule material 11 is made by mixing the microcapsule 6 and the binder 10 with an appropriate mixing ratio. The microcapsule material 11 is selectively disposed at only a predetermined given position, not disposed on the whole surface of the first substrate 3.

Accordingly, the microcapsule material 11 is selectively disposed particularly only on the display area 9, i.e. on the pixel electrode 2 (segment electrode 2a). Here, prior to the process in which the microcapsule material 11 is selectively disposed, it is preferable that the display area 9 on which the microcapsule material 11 is disposed is subjected to a lyophilic process so as to have a high wettability with respect to the microcapsule material 11, while the background area 15 is subjected to a lyophobic process so as to have a low wettability with respect to the microcapsule material 11. The lyophlic process can be conducted by performing plasma treatment on the surface of the pixel electrodes 2, for example. The lyophobic process with respect to the background area 15 can be conducted by fluorination treatment or the like using flouroalkylsilane (FAS), etc. Accordingly, by conducting the lyophilic process and lyophobic process, the microcapsule material 11 can be selectively disposed with high accuracy.

Selective disposing of the microcapsule material 11 on the electrophoretic electrode 2 (segment electrode 2a) is not particularly limited. For example, various kinds of printing methods such as screen printing, etc., and methods using dispensers can be employed. In a case where each segment electrode 2a is formed in the same shape and size, i.e. has an equal area, the method using the dispenser is particularly preferred.

Use of the dispenser eases selective disposing of the microcapsule material 11. Also, the material can be easily discharged with few influences of the viscosity of the microcapsule material 11 or the diameter of the microcapsule 6. In addition, by setting the amount of the microcapsule material 11 supplied to the dispenser to be equal for every segment electrode 2a (pixel electrode 2), the microcapsule material 11 can be coated on the display area formed on each segment electrode 2a (pixel electrode 2) with a nearly uniform thickness, whereby a display performance of each segment electrode 2a (pixel electrode 2) can be uniformed.

After selectively disposing the microcapsule material 11 on the display area 9 in this way, the microcapsule material 11 is dried. Methods for drying are not particularly limited. Various kinds of conventionally known drying methods such as drying by heating with heaters or the like, drying by blowing of warm air or hot air, reduced-pressure drying, and the like can be employed. The drying makes the binder 10 to be solid, so that the microcapsule 6 is fixed on the pixel electrode 2. In this case, the microcapsule 6 forms a single layer structure with a condition in which the microcapsules 6 are congested (are adhered each other) on the pixel electrode 2. In the process of drying, the single layer is adhered on the pixel element 2 with no gaps.

Subsequently, with respect to the first substrate 3 on which the microcapsule 6 is coated, the second substrate 5 is faced. Then the substrates are bonded so that the conductive part 7 is electrically conducted to the common electrode 4 via the conductive material 7a disposed in advance. By laminating them at this condition, the display devise 1 shown in FIG. 1 is achieved.

In a case where the second substrate 5 is a sheet or film before cutting it to a single plate as described above, the coating and drying processes are sequentially continuously conducted. After completion of these processes, it is cut to be a single plate and used before attaching it to the first substrate 3 (glass substrate).

The display device 1 achieved as described above has the following advantages. The microcapsule 6 is selectively disposed on the display area 9. This selective disposing only on a necessary part results in no waste of the material. As a result, production costs are reduced. In addition, the background area 15 serving as the background with respect to the display area 9 is colored with the background color. Thus, the way such as the conventional one is not required in which the microcapsule located in the background drives its display material. According to the invention, only the pixel electrode 2 (segment electrode 2a) performing the actual display is driven. As a result, a driving circuit is simply constructed. Further, the waste of the material caused by coating the microcapsule 6 on the background is eliminated.

The method for manufacturing the display device has the following advantages. The microcapsule material 11 including the microcapsule 6 is selectively disposed on the display area 9 on the segment electrode 2a. This selective disposing only on a necessary part results in no waste of the material. In addition, a conventional process is not required in which the microcapsule that has been coated is stripped off. Thus, the lowering of the display characteristics caused by the process can be prevented. Also, the waste of the material caused by the stripping can be eliminated.

Further, the microcapsule material 11 is selectively disposed using the dispenser. The material can be easily discharged with few influences of the viscosity of the microcapsule material 11 or the diameter of the microcapsule 6. As a result, the lowering of the productivity such as the conventional method using the inkjet method can be prevented.

In addition, the microcapsule material 11 is directly disposed on the display area 9. This allows the coating position or coating amount of the microcapsule material 11 to be easily and well controlled.

In the embodiment, the second substrate 5 on which the common electrode 4 has been formed in advance is prepared so as to be bonded to the first substrate 3. The invention, however, is not limited to this. For example, the common electrode 4 may be formed on the first substrate 3. Then, the substrate 5a of the second substrate 5 may be bonded so as to cover the common electrode 4 to form the second substrate 5. Simultaneously, the display device 1 may be formed.

Figure 4A:
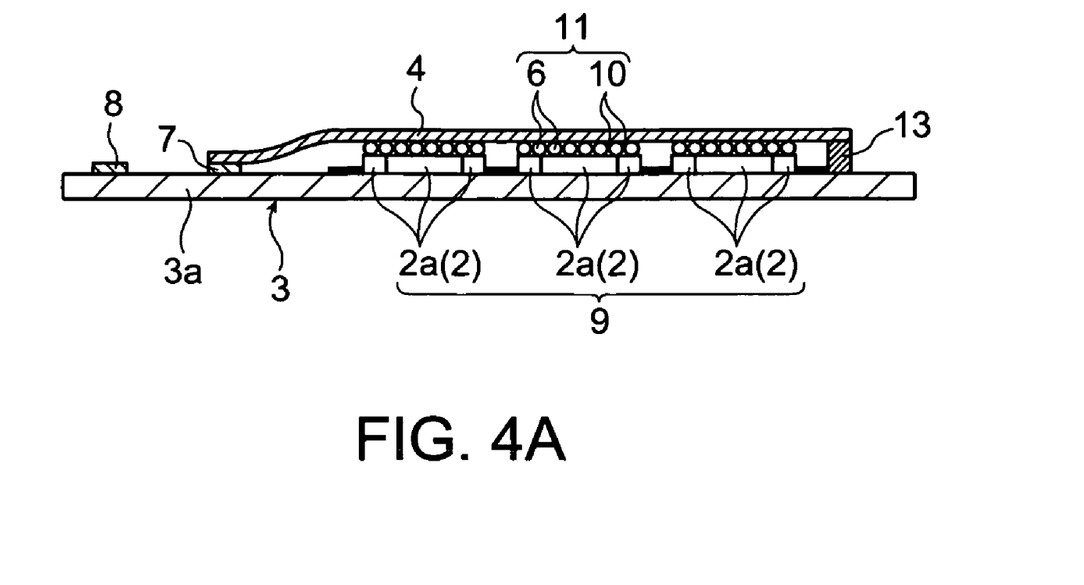
FIGS. 4A and 4B are diagrams to explain a modified example of the first embodiment.

That is, as shown in FIG. 4A, a transparent conductive material is disposed to form the common electrode 4 so as to cover the microcapsule 6 on the display area 9 and the conductive part 7. Here, for the transparent conductive material, conductive oxides such as indium tin oxide (ITO), etc., electron conductive polymers such as polyaniline, etc., and ion conductive polymers in which an ionic material such as NaCl, LiClO4, KCl, etc., is dispersed in a matrix resin such as polyvinyl alcohol resins, polycarbonate resins and the like can be used. As for the method for disposing the transparent conductive material, various kinds of conventional known methods such as bonding methods, various kinds of printing methods, spattering methods, vapor-deposition methods, etc., can be employed in accordance with the types and forms of the transparent conductive material. In a case where the spattering method or vapor-deposition method is employed, methods that include a selective vapor deposition with a mask or patterning by etching or the like after forming a film, etc., can be combined.

By forming the common electrode 4 in this way, the concave part of the concavo-convex part formed by a disposal of the microcapsule 6 can be buried with the transparent conductive material. In this case, since the transparent conductive material is directly disposed on the conductive part 7 of the first substrate 3, the conductive material 7a shown in FIG. 1 is not required.

Here, after forming the common electrode 4, a sealing member 13 is disposed between the first substrate 3 and the common electrode 4, particularly at an outer circumference side of the display area 9, to protect the pixel electrodes 2 or microcapsule 6 from moisture or the like.

Figure 4B:
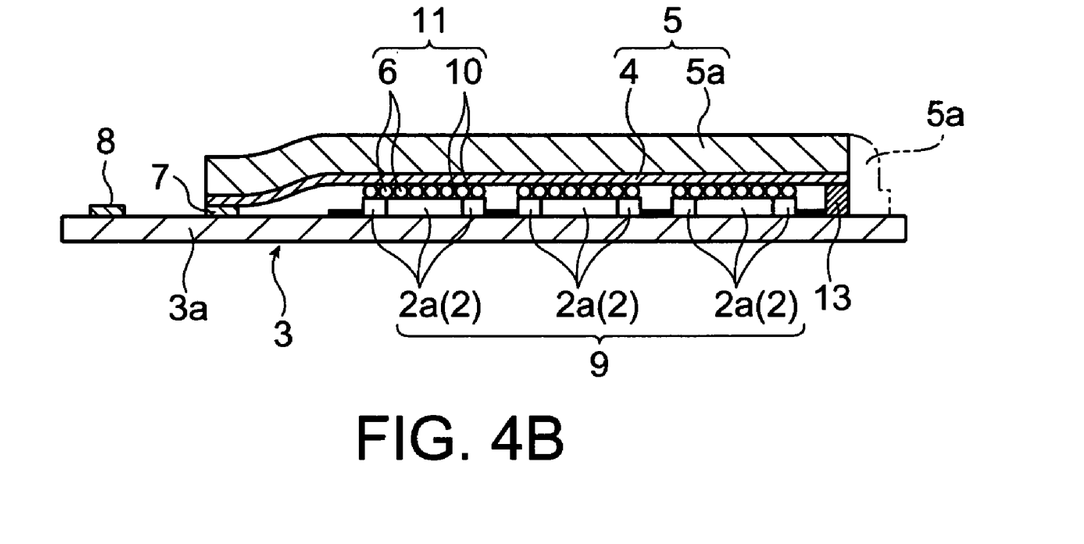

Then, as shown in FIG. 4B, the transparent substrate material (substrate 5a) serving as the flexible substrate is bonded so as to cover the common electrode 4 to form the second substrate 5. Simultaneously, the second substrate 5 is bonded (laminated) on the first substrate 3. When bonding the transparent substrate material (substrate 5a), if the bonding is conducted so as to cover the sealing member 13 as indicated with the chain double-dashed line in FIG. 4B, not conducted so as to merely cover the common electrode 4 as indicated with the solid line in FIG. 4B, the sealing property is more improved and it is preferred.

In the manufacturing method, the common electrode 4 is formed by disposing the transparent conductive material so as to cover the microcapsule 6 that has been dried. Further, the transparent substrate material (substrate 5a) is bonded so as to cover the common electrode 4. This allows the concave part of the concavo-convex part formed by a disposal of the microcapsule 6 to be buried with the transparent conductive material. Therefore, in a case where the second substrate 5 is served as the display surface, the lowering of the display performance due to a gap formed between the microcapsules 6 at the second substrate 5 side can be prevented.

Second Embodiment

Next, a second embodiment of the display device according to the invention will be described.

Figure 5:
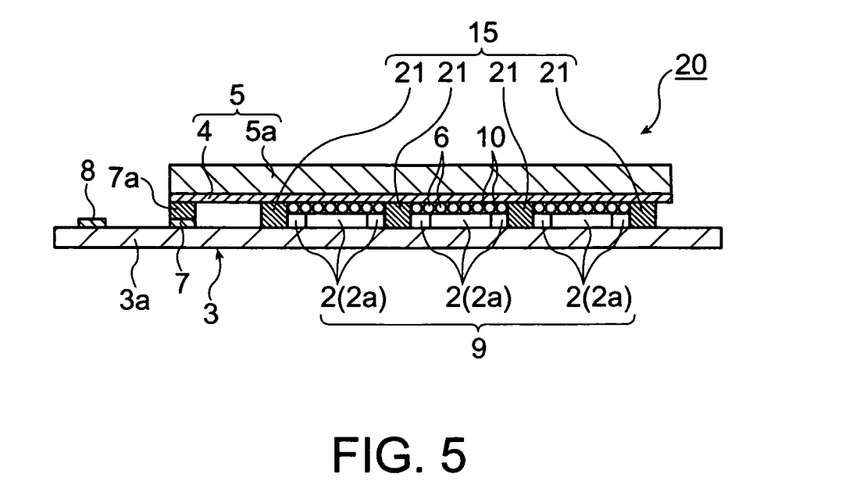
FIG. 5 is a sectional side view illustrating a schematic construction of a second embodiment of the display device according to the invention.

FIG. 5 is a diagram showing the second embodiment of the display device of the invention, and a display device 20 is shown in FIG. 5. The display device 20 is mainly differed from the display device 1 shown in FIG. 1 in the followings: the background area 15 is formed by a partition 21 surrounding the display area 9; and both the first substrate 3 and the second substrate 5 are the flexible substrate, thereby the display device 20 has flexibility.

In the display device 20, the partition 21 is formed at the position serving as the background 15 surrounding the pixel electrode 2 (segment electrode 2a) in FIG. 2. The partition 21 is formed by resins such as polyethylene terephthalate (PET), polyethersulphone (PES), polyimide (PI), polyethylene (PE), etc., and resins that fluorinate these resins. The partition 21 is formed so that its height is nearly equal to the sum of the thickness of the pixel electrode 2 (segment electrode 2a) formed so as to be surrounded by the partition 21 and the layer that is composed of the microcapsule material 11, disposed and formed on the pixel electrode 2.

Here, the partition 21 functions as the background area 15. Thus, the partition 21 is colored with the background color. That is, the partition 21 is colored with the same color (in the embodiment, it is white) as those of the particles, which serves as the background, of two types of electrophoretic particles in the microcapsule 6.

In order to form the display device 20, the first substrate 3 and the second substrate 5 are prepared in the same way of the first embodiment.

Figure 6A:
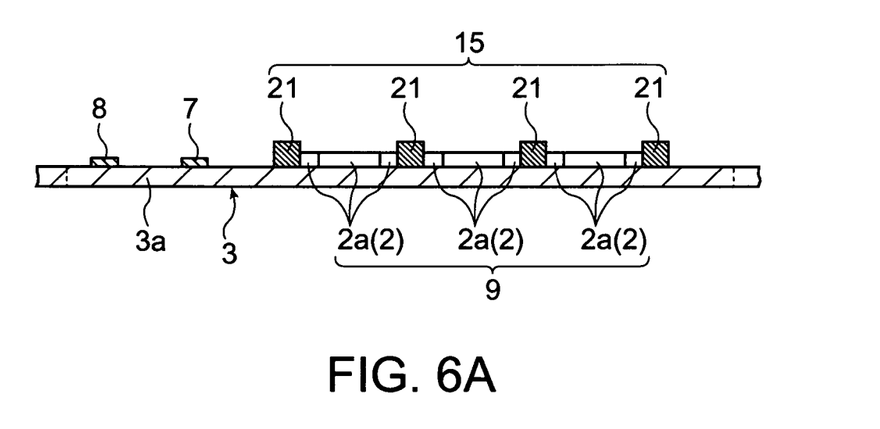
FIGS. 6A and 6B are diagrams to explain the manufacturing method of the second embodiment.
Figure 6B:
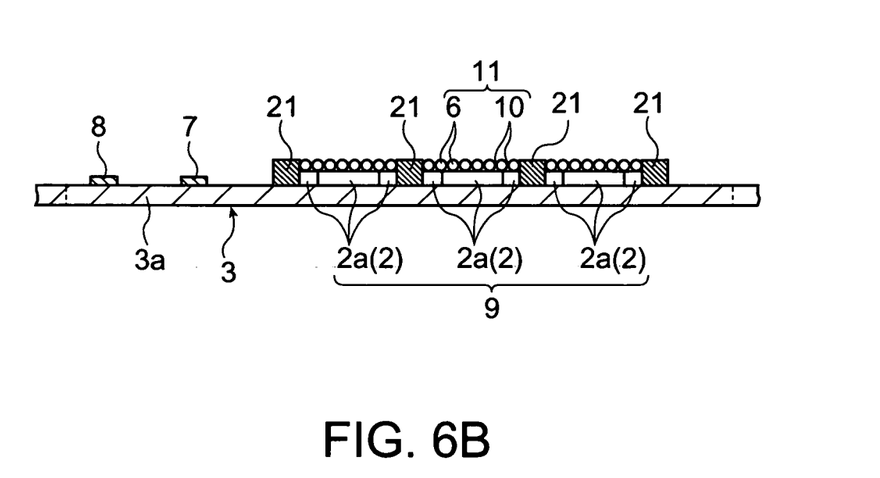

First, the substrate 3a having flexibility on which the pixel electrode 2 composed of the segment electrode 2a, the conductive part 7, and the terminal part 8 are formed is prepared as the first substrate 3 as shown in FIG. 6A. The first substrate 3 is a sheet or film that is before cutting it to a single sheet.

Then, with respect to the first substrate 3, the partition 21 is formed on the position serving as the background area 15 in FIG. 2, i.e. the position that surrounds the pixel electrode 2 (segment electrode 2a). As for the formation of the partition 21, the aforementioned material is selectively disposed on the position serving as the background area 15 using the dispenser method or the inkjet method, etc. Then, it is subjected to drying (firing), etc. to be formed as the partition 21. Alternatively, the material may be formed on the whole surface by the spin coat method, etc. Then, the partition 21 may be selectively formed on the position serving as the background 15 by the patterning using the etching, etc. Moreover, the partition 21 may be directly formed by the screen printing method.

The partition 21 formed as described above is required to be colored with the background color as aforementioned since it serves as the background. The coloring method can include various printing methods such as screen printings, inkjet methods, etc. Pigments or dye may be mixed into the forming material of the partition 21 in advance so that the partition 21 formed shows the background color.

Particularly, in order to ease the selective disposing of the microcapsule material 11 that will be described later, as aforementioned, it is preferable that the display area 9 on which the microcapsule material 11 is disposed is subjected to the lyophilic process so as to have a high wettability with respect to the microcapsule material 11, while the partition 21 serving as the background area 15 is subjected to the lyophobic process so as to have a low wettability with respect to the microcapsule material 11.

The lyophlic process can be conducted by performing plasma treatment or the like on the surface of the pixel electrodes 2 as described above. It is preferred that the lyophobic process with respect to the partition 21 is conducted using polyimide (PI) or resins that fluorinate the aforementioned resins as the material for forming the partition 21.

Then, the microcapsule material 11 including the microcapsule 6 is selectively disposed on the pixel electrode 2 (segment electrode 2a), i.e. the area surrounded by the partition 21, of the first substrate 3 on which the partition 21 is formed as shown in FIG. 5B. As for the selective disposing of the microcapsule material 11 to the display area 9, the method using the dispenser is preferably employed in the same way of the first embodiment. In the embodiment, particularly, the partition 21 surrounds the pixel electrode 2 (segment electrode 2a) serving as the display area 9. For example, the viscosity of the microcapsule material 11 is set low. This allows the material layer to be well formed even though by discharging the material from the dispenser nozzle fixed at one place without moving the dispenser nozzle on the pixel electrode 2 (segment electrode 2a). This is because that the material spreads to be leveled due to its fluidity. As a result the thickness of the formed material layer becomes nearly uniform.

Here, in the embodiment, the first substrate 3 is the flexible substrate of a sheet or film. This allows the coating process of the microcapsule to the flexible substrate and the subsequent drying process to be continuously conducted. That is, since the microcapsule is coated on the flexible substrate, the flexible substrate material of a sheet or film winded to a drum is flowed by a feeding-winding method from a reel-to-reel. During the flow, the coating and drying processes are continuously conducted. As a result, productivity can be increased. Obviously, after completion of theses processes, the processed flexible substrate material is cut to be a single plate before bonding it to the second substrate 5 or after bonding.

After selectively disposing the microcapsule material 11 on the display area 9, the microcapsule material 11 is dried in the same way of the first embodiment. By the drying, the microcapsule 6 is fixed on the display area 9. In this case, the microcapsule 6 forms a single layer structure with a condition in which the microcapsules 6 are congested (are adhered each other) on the display area 9. In the process of drying, the single layer is adhered on the display area 9 with no gaps.

Then, the first substrate 3 on which the microcapsule 6 has been fixed, and the second substrate 5 are bonded in the same way of the first embodiment. In the embodiment, the following two ways may be employed. As shown in FIG. 3, one on which the common electrode 4 has been formed in advance may be used as the second substrate 5. Then, the substrate 5 may be bonded to the first substrate 3. In contrast, as described in FIGS. 4A and 4B, by disposing the common electrode 4 and the substrate 5a on the first substrate 3 in order so as to form the second substrate 5, simultaneously, the display device 20 may be formed.

In a case where both the first substrate 3 and the second substrate 5 are a sheet or film before cutting them to a single plate, after completion of the bonding process, both the first substrate 3 and the second substrate 5 are cut to make display device 20 as a single plate.

The display device 20 achieved as described above has the following advantages. The microcapsule 6 is selectively disposed on the display area 9. This selective disposing only on a necessary part results in no waste of the material. As a result, production costs are reduced. In addition, the partition 21 (the background area 15) serving as the background with respect to the display area 9 is formed and colored with the background color. Thus, the way such as the conventional one is not required in which microcapsule located in the background drives its display material. Therefore, according to the invention, only the pixel electrode 2 (segment electrode 2a) performing the actual display is driven. As a result, a driving circuit is simply constructed. Further, the waste of the material caused by coating the microcapsule 6 on the background is eliminated.

In addition, the background area 15 is formed by the partition 21 surrounding the display area 9 (pixel electrode 2). This allows the microcapsule material 11 to be more selectively disposed by disposing the microcapsule material 11 to the area surrounded by the partition 21 when the microcapsule material 11 is disposed on the display area in the manufacturing.

The method for manufacturing the display device has the following advantages. The microcapsule material 11 including the microcapsule is selectively disposed on the display area 9. This selective disposing only on a necessary part results in no waste of the material in the same way of the first embodiment. In addition, a conventional process is not required in which the microcapsule that has been coated is stripped off. Thus, the lowering of the display characteristics caused by the process can be prevented. Also, the waste of the material caused by the stripping can be eliminated.

Moreover, the partition 21 is formed to the background area 15 by disposing the partition material. This allows the microcapsule material to be more selectively disposed with respect to the display area 9 (pixel electrode 2) as described above.

Further, since the microcapsule material 11 is selectively disposed using the dispenser, the lowering of productivity can be prevented in the same way of the first embodiment.

Figure 11A:
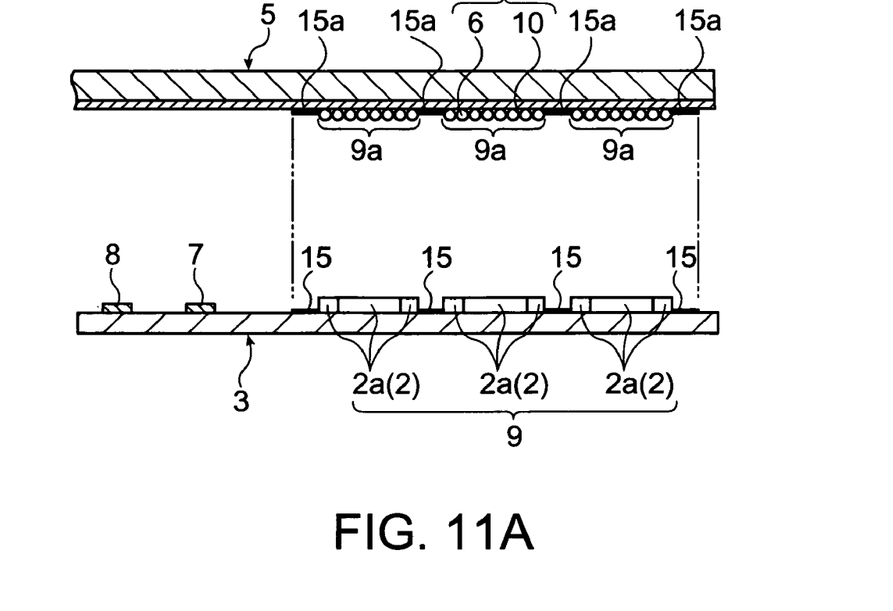
FIGS. 11A and 11B are diagrams explaining areas corresponding each other on the first and second substrates.

Here, it should be understood that the invention is not limited to the embodiments but is applied to various kinds of modifications without departing from the scope and spirit of the invention. For example, in the embodiment, while the microcapsule material 11 is disposed on the first substrate 3, the microcapsule material may be selectively disposed on the area corresponding to the display area 9 formed by the pixel electrode of the second substrate 5. That is, as shown in FIG. 11A, the microcapsule material 11 may be disposed on an area 9a on the second substrate 5, not on the display area 9. The area 9a corresponds to the display area 9. Here, the word "correspond to" means that the area 9a and the display area 9 are respectively located on the first and second substrates so that the both areas are stuck together when the substrates are bonded in a laminate process as shown in FIG. 11A. Accordingly, since the display area 9 and the area 9a are bonded together in the laminate process, the display device 1 can be achieved in terms of results, even if the microcapsule material 11 is disposed on the display area 9, or the area 9a.

Figure 11B:
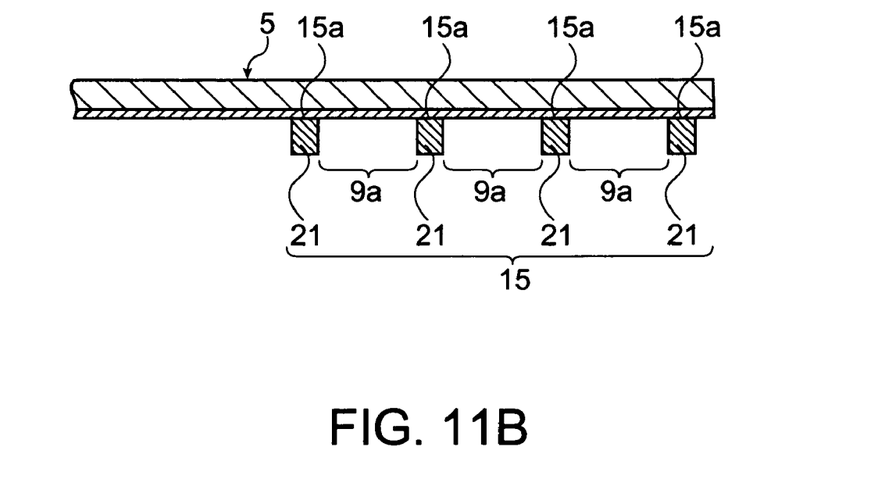

In a case where the microcapsule material 11 is selectively disposed on the area 9a, not on the display area 9, the following processes are preferably performed in prior to the process to dispose the microcapsule material. The lyophilic process is performed on the area 9a so that the area 9a has a higher wettability to the microcapsule material 11, while the lyophobic process is performed on a region excluding the area 9a, i.e. an area 15a corresponding to the background area 15, so that the area 15a has a lower wettablity to the microcapsule material 11. Methods similar to the aforementioned methods can be applied to the lyophilic and lyophobic processes. In contrast, in a case where the microcapsule material 11 is selectively disposed on the area 9a, not on the display area 9, the partition 21 may be formed on the area 15a corresponding to the background area 15 as shown in FIG. 11B.

In the embodiment, a case is described in which the display material encapsulated in the microcapsule 6 is mainly the electrophoretic particles. However, the invention is not limited to this, but liquid crystals may be applicable, for example.

In the first embodiment, the background area 15 is colored with the background color by coloring the first substrate 3 using printing, etc. However, the invention is not limited to this. For example, in a case where a substrate made of resin is used as the substrate 3a serving as the base member of the first substrate 3, the color of the substrate 3a serving as the base member may be the same color as that of the background color. That is, pigments or dye of a desired color is mixed into the resin material in advance so that the substrate 3a shows the same color as that of the background color. Accordingly, the coloring process is not required that colors particularly the background area 15 with the background color by printing or the like. As a result, manufacturing processes can be simplified.

In addition, the area 15a, which corresponds to the background area 15, of the second substrate 3 may be colored with the background color. Since the background area 15 and the area 15a are bonded in the laminate process, the same effect can be obtained in terms of results even if the background area 15 or the area 15a is colored. Methods similar to the aforementioned method for coloring the background area 15 can be applied to color the area 15a.

In the embodiment, as for the material of each substrate, either one or both of them is the flexible substrate. However, both of them may be a hard substrate.

In the embodiment, a case where the number of display areas is one is described. However, the manufacturing method of the invention can also be applied to a case where a plurality of display areas is individually formed as islands.

Next, an electronic apparatus according to the invention will be described. The electronic apparatus according to the invention is equipped with the display device of the invention.

Below, examples of the electronic apparatus having the display device will be described.

Mobile Computer

Figure 7:
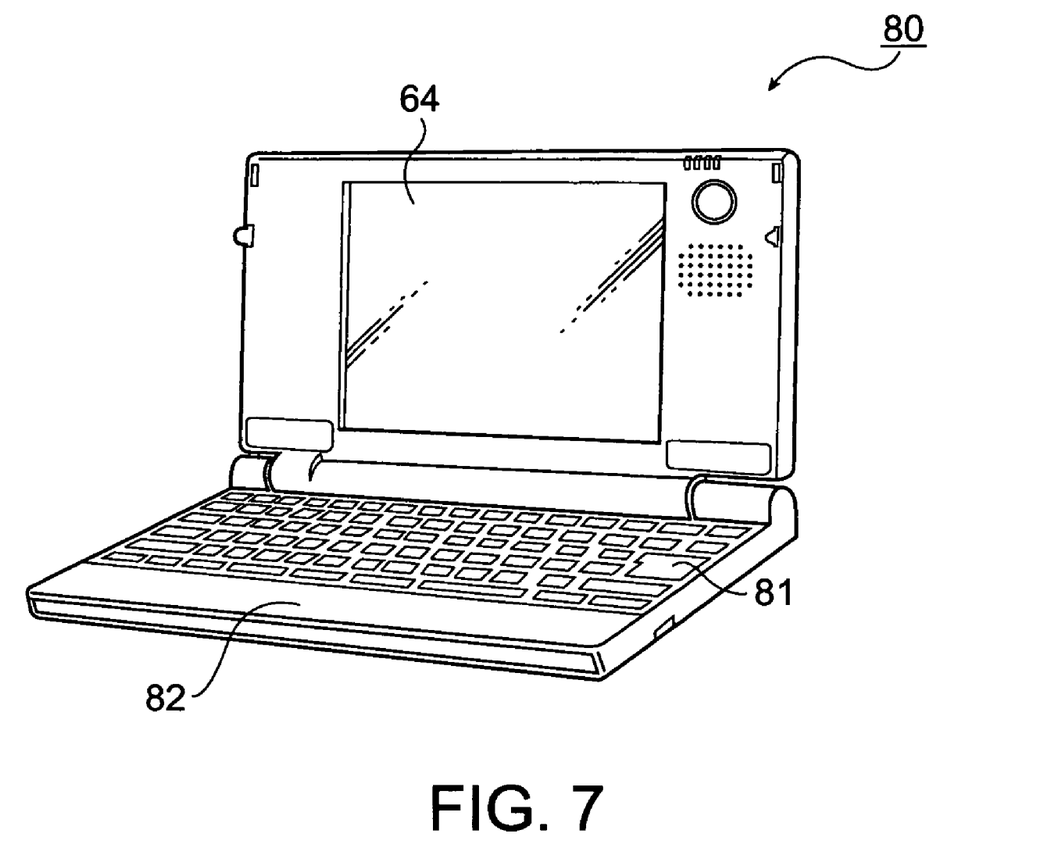
FIG. 7 is a perspective view illustrating an external configuration of a computer that is an example of an electronic apparatus according to the invention.

First, an example will be described in which the display device is applied to a mobile type personal computer. FIG. 7 is a perspective view illustrating the construction of the personal computer. A personal computer 80 includes a body 82 equipped with a keyboard 81 and a display unit equipped with a display device 64 as shown in FIG. 7.

Cellular Phone

Figure 8:
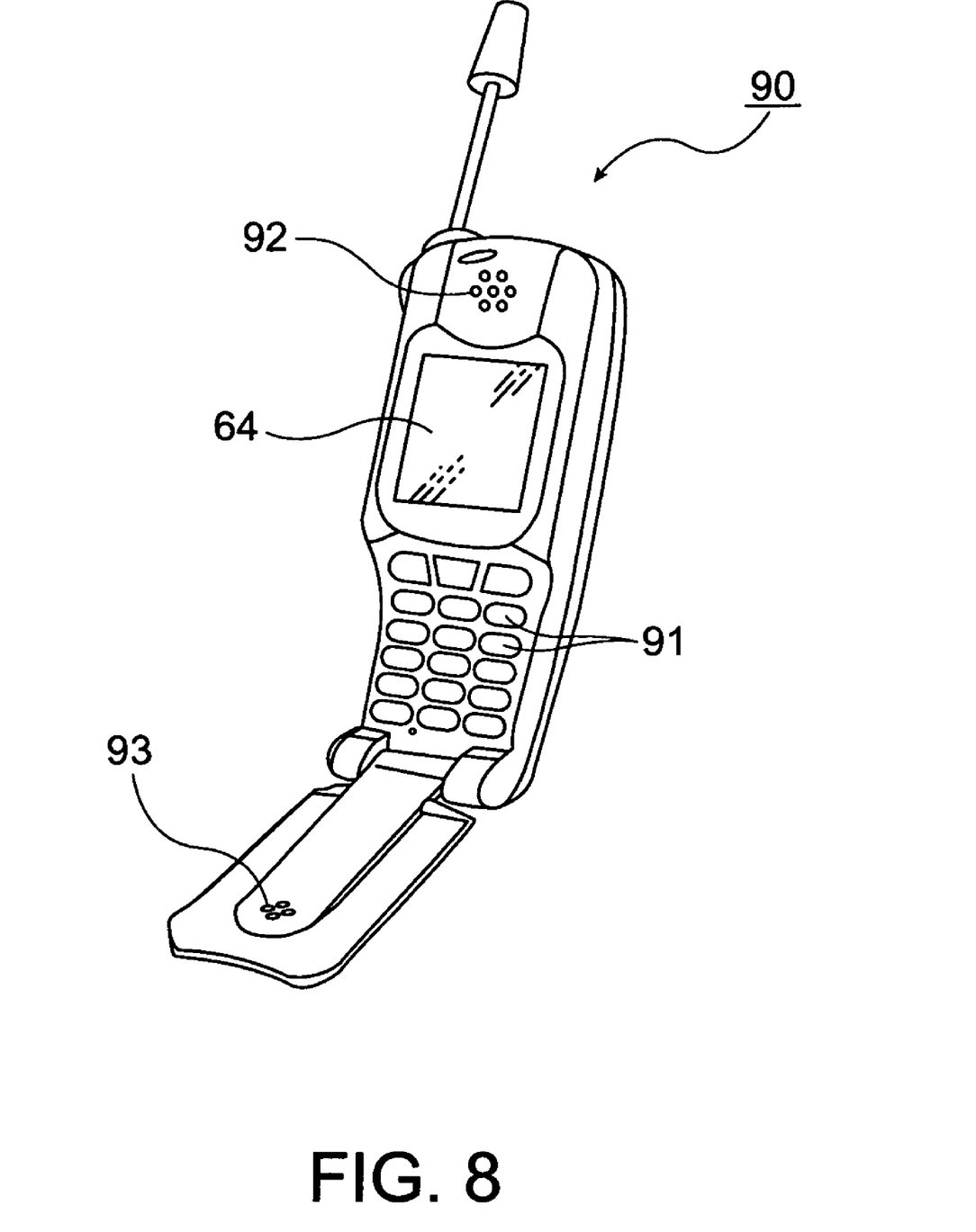
FIG. 8 is a perspective view illustrating an external configuration of a cellular phone that is another example of the electronic apparatus of the invention.

Next, a case will be described in which the display device is applied to a display of a cellular phone. FIG. 8 is a perspective view illustrating the construction of the cellular phone. A cellular phone 90 is equipped with a plurality of operational buttons 91, an earpiece 92, a mouthpiece 93, and the display device 64 as shown in FIG. 8.

Electronic Paper

Figure 9:
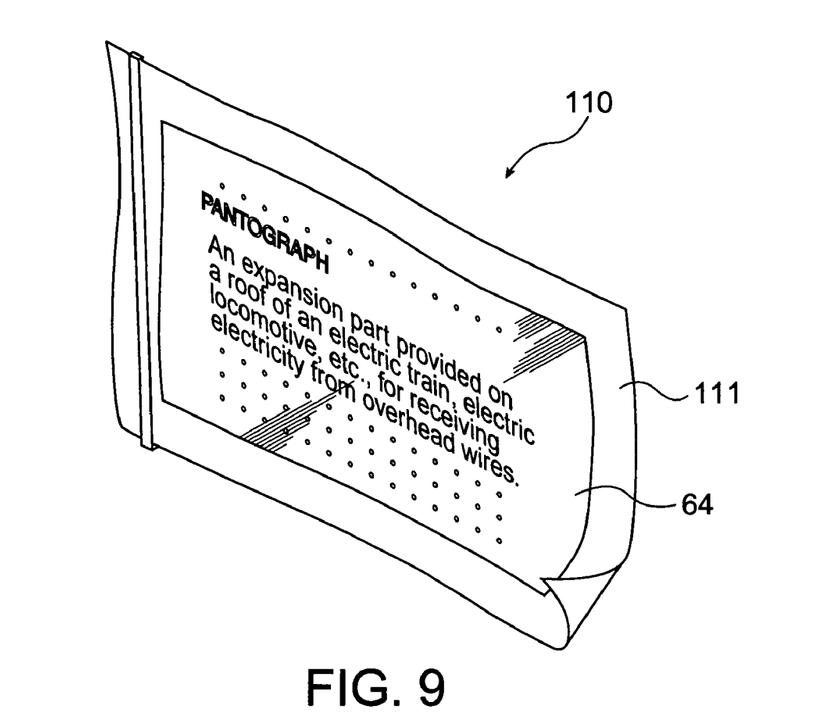
FIG. 9 is a perspective view illustrating an external configuration of electronic paper that is another example of the electronic apparatus of the invention.

Next, a case will be described in which the display device is applied to a display of electronic paper. FIG. 9 is a perspective view illustrating the construction of the electronic paper. Electronic paper 110 is composed of a body 111 made of a rewritable sheet having texture and flexibility similar to paper, and a display equipped with the display device 64.

Electric Notebook

Figure 10:
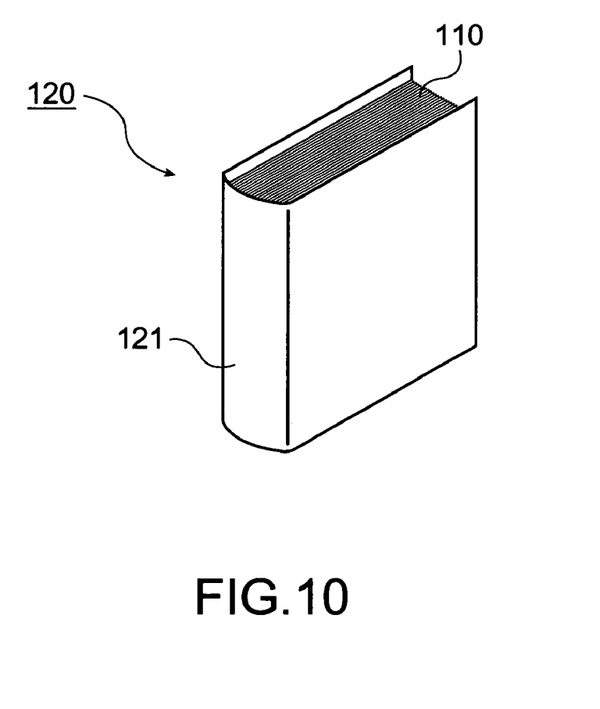
FIG. 10 is a perspective view illustrating an external configuration of an electronic notebook that is another example of the electronic apparatus of the invention.

FIG. 10 is a perspective view illustrating the construction of an electronic notebook. In an electronic notebook 120, a plurality of pieces of electronic paper 110 shown in FIG. 9 is bound up and sandwiched by a cover 121 as shown in FIG. 10. By equipping display data input means to the cover 121, the display content of the electronic paper can be changed as it is bound.

Since the electronic apparatuses are equipped with the display device that is manufactured without the waste of the material and has a simplified circuit for driving the display material in the microcapsule, costs are reduced and the configuration is simplified.

Examples of the electronic apparatus can include IC cards equipped with the display device as a display and further fingerprint detection sensors, etc., electronic books, view finder type video tape recorders, monitor direct view type video tape recorders, car navigation devices, pagers, electronic organizers, calculators, word processors, work stations, picture telephones, POS terminals, and devices having touch panels, in addition to the personal computer shown in FIG. 7, the cellular phone shown in FIG. 8, the electronic paper shown in FIG. 9, and the electronic notebook shown in FIG. 10. Obviously, the display device can be applied as the display of these various electronic apparatuses.

What is claimed is:

1. A display device, comprising:
a first substrate having a pixel electrode;
a second substrate having a common electrode;
a microcapsule sandwiched between the first substrate and the second substrate; and
a display material changing its optical characteristic in response to an electrical stimulation, the display material being encapsulated in the microcapsule, the microcapsule being selectively disposed on a display area formed by the pixel electrode in between the first substrate and the second substrate, and a background area of one of the first substrate and the second substrate being colored with a background color, the background area serving as a background with respect to the display area, and one of the first substrate and the second substrate that serves as the background area including a base member having a same color as that of the background color.

2. The display device according to claim 1, the display material being an electrophoretic dispersion liquid including a liquid dispersion medium and an electrophoretic particle.

3. The display device according to claim 1, the first substrate and the second substrate being a flexible substrate.

4. An electronic apparatus comprising the display device according to claim 1.

5. A display device, comprising:
a first substrate having a pixel electrode;
a second substrate having a common electrode;
a microcapsule sandwiched between the first substrate and the second substrate; and a display material changing its optical characteristic in response to an electrical stimulation, the display material being encapsulated in the microcapsule, the microcapsule being selectively disposed on a display area formed by the pixel electrode in between the first substrate and the second substrate, and a background area of one of the first substrate and the second substrate being colored with a background color, the background area serving as a background with respect to the display area, and the background area being formed by a partition surrounding the display area.

6. The display device according to claim 5, wherein the display material is an electrophoretic dispersion liquid including a liquid dispersion medium and an electrophoretic particle.

7. The display device according to claim 5, wherein the first substrate and the second substrate are a flexible substrate.

8. An electronic apparatus comprising the display device according to claim 5.

9. A method for manufacturing a display device including a first substrate having a pixel electrode, a second substrate having a common electrode, a microcapsule sandwiched between the first substrate and the second substrate, and a display material changing its optical characteristic in response to an electrical stimulation, the display material being encapsulated in the microcapsule, the method comprising:

selectively disposing a microcapsule material including the microcapsule on one of a first area composed of a display area formed by the pixel electrode on the first substrate and a second area on the second substrate, the second area corresponding to the display area;

coloring at least one of a third area composed of a background area serving as a background with respect to the display area on the first substrate and a fourth area on the second substrate, the fourth area corresponding to the background area, with a background color;

drying the microcapsule material; and bonding the first substrate and the second substrate after drying.

10. The method for manufacturing a display device according to claim 9, the display material being an electrophoretic dispersion liquid including a liquid dispersion medium and an electrophoretic particle.

11. The method for manufacturing a display device according to claim 9, the microcapsule material being selectively disposed on the first area.

12. The method for manufacturing a display device according to claim 9 further comprising forming a partition to one of the third area upon disposing the microcapsule material on the first substrate and the fourth area upon disposing the microcapsule material on the second substrate by disposing a partition material prior to selectively disposing the microcapsule material.

13. The method for manufacturing a display device according to claim 12 further comprising:

using the partition material having lyophobicity; and performing a lyophilic process on one of the first area upon disposing the microcapsule material on the first substrate and the second area upon disposing the microcapsule material on the second substrate, prior to selectively disposing the microcapsule material.

14. The method for manufacturing a display device according to claim 9, the first substrate and the second substrate being a flexible substrate.

15. The method for manufacturing a display device according to claim 9, the microcapsule material being selectively disposed using a dispenser upon disposing the microcapsule material.

16. The method for manufacturing a display device according to claim 15, the pixel electrode being disposed in multiple numbers, each pixel electrode having a same area.

17. The method for manufacturing a display device according to claim 9 further comprising:

performing a lyophilic process on the first area and a lyophobic process on the third area upon disposing the microcapsule material on the first area; and performing the lyophilic process on the second area and the lyophobic process on the fourth area upon disposing the microcapsule material on the second area.

18. A display device manufactured according to the method of claim 9.

* * * * *